United States Patent Office 3,784,621
Patented Jan. 8, 1974

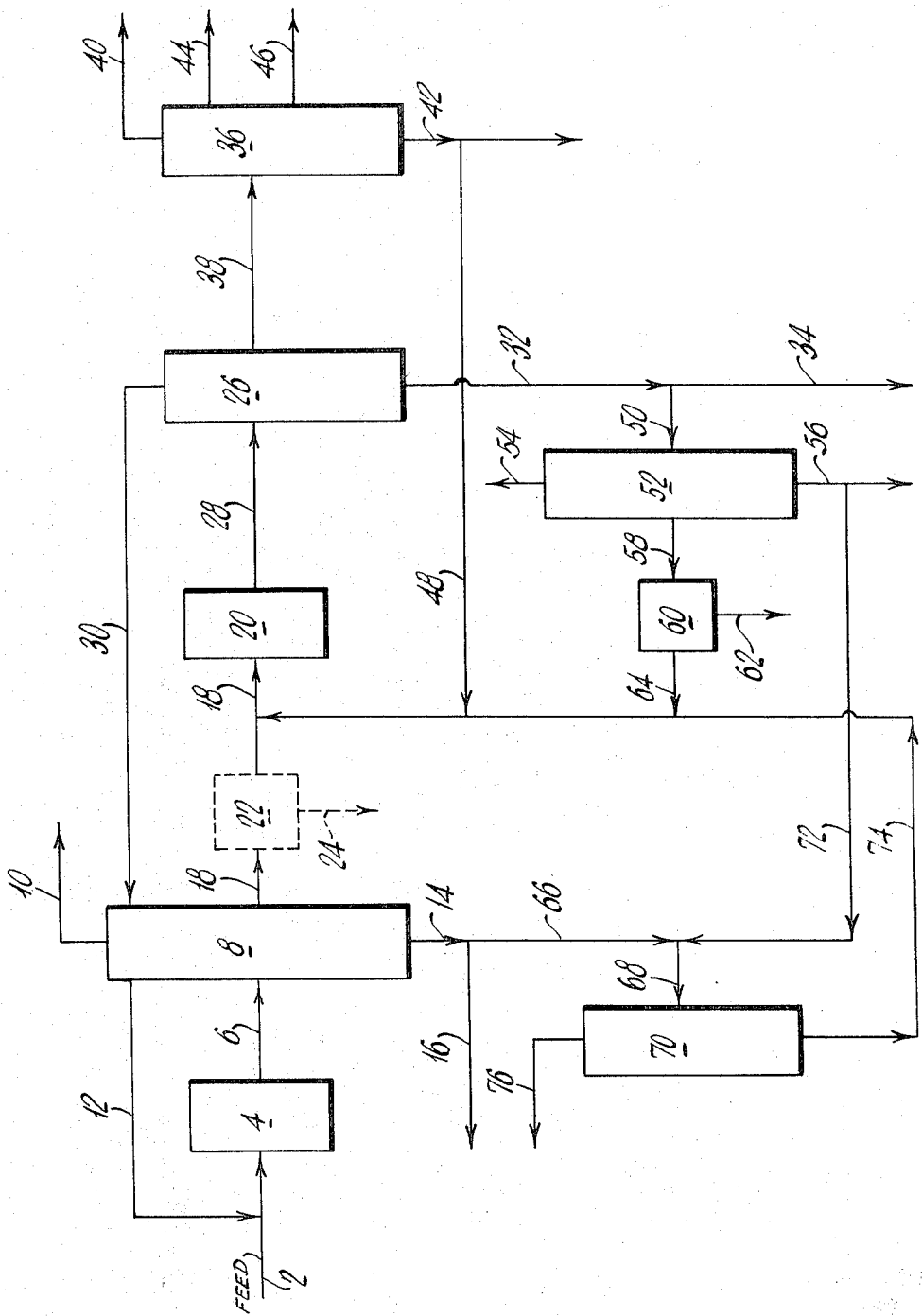

3,784,621
DISPROPORTIONATION OF ALKYLAROMATIC
HYDROCARBONS
Robert M. Suggitt, Wappingers Falls, N.Y., assignor to
Texaco Development Corporation, New York, N.Y.
Filed Nov. 11, 1971, Ser. No. 197,832
Int. Cl. C07c 3/62
U.S. Cl. 260—672 T       19 Claims

ABSTRACT OF THE DISCLOSURE

A process is provided for the production of methylated aromatic hydrocarbons, and in a particularly preferred embodiment tri- and tetramethylbenzenes, by the steps of disproportionating toluene in a first disproportionation reactor, separating a $C_8$ aromatic fraction from the products of the first reactor and disproportionating the $C_8$ fraction in a second disproportionation reactor and separating and recovering tri- and tetramethylbenzene fractions substantially free of ethyl-aromatic derivatives.

BACKGROUND OF THE INVENTION

This invention relates to a process for the production of aromatic hydrocarbons. More particularly, this invention relates to a process for the preparation and recovery of tri- and tetramethylbenzenes by toluene disproportionation.

Trimethylbenzenes, such as mesitylene, represent a valuable class of hydrocarbons and can be found in the $C_9$ aromatic fraction from a catalytic reformer. However, recovery of this trimethylbenzene from such a $C_9$ aromatic fraction in high purity by means of distillation is impractical inasmuch as the stream also contains significant amounts of orthoethyltoluene, the latter boiling within less than 1° F. of the boiling point of mesitylene. Tetramethylbenzenes such as durene on the other hand are present only in low concentrations in aromatic stocks ordinarily found in a refinery as for example the $C_{10}$ aromatic fraction from a catalytic reformer. Presently, tri- methylbenzenes such as pseudocumene and mesitylene are highly desirable hydrocarbons and are being sought in ever increasing quantities. Such methylated aromatics are valuable components in the production of trimellitic anhydride a high performance plasticizer, trimesic acid employed in cross-linked polymers and mesidine a dye intermediate. Durene is a valuable material in making high temperature resistant polymers by converting the same to pyromellitic dianhydride.

While increasing the availability of tri- and tetramethylbenzenes is of course a prime consideration, further demand exists for a flexible process that is capable of providing other valuable by-products in response to market demands, as for example, selected xylene isomers and high octane aromatic components suitable for blending with motor naphtha pool gasolines. As such, a highly valuable process would be one permitting the recovery of all of the aforementioned hydrocarbons in high purity and in amounts depending upon the prevailing market conditions.

It is therefore an object of this invention to provide a process for converting toluene to other valuable hydrocarbon fractions.

Another object of this invention is to provide a process for the synthesis and recovery of tri- and tetramethylbenzenes in high purity from toluene.

Yet another object of this invention is to provide a process for the production and recovery of tri- and tetramethylbenzenes where the recovered streams are substantially free of ethylated aromatics.

Other objects and advantages will be apparent from a reading of the following detailed description and example.

SUMMARY OF THE INVENTION

Broadly, this invention contemplates a process for the production of methylated aromatic hydrocarbons which comprises the steps of:

(a) Catalytically disproportionating toluene in the presence of hydrogen;

(b) Separating the product of (a) into a benzene fraction, a toluene fraction, a $C_8$ fraction and a $C_9$ and heavier fraction, and recycling said toluene fraction to (a);

(c) Catalytically disproportionating said $C_8$ fraction of (b) in the presence of hydrogen;

(d) Separating the product of (c) into a $C_6$ to $C_8$ fraction, a $C_9$ fraction and a $C_{10}$ and heavier fraction, and recycling said $C_6$ to $C_8$ fraction to step (b); and (e) Recovering said $C_9$ fraction of (d).

Toluene, as the feedstock for the instant process, is the most plentiful and least expensive of the various methylbenzenes and is readily available in high purity. The process described herein involves the use of multiple stage disproportionation reactions. Although some impurities are nevertheless formed in the course of disproportionation, the tri- and tetramethylbenzenes, mesitylene, pseudocumene and durene, can be generated in good yields and recovered in pure form employing conventional means for separation and recovery, as for example fractionation and in the case of durene, crystallization. Recoverable and valuable co-products include benzene and xylenes.

DESCRIPTION OF PREFERRED EMBODIMENTS

In one embodiment of this invention there is contemplated a continuous and cyclic process for the production of trimethylbenzenes the steps of which comprise disproportionating toluene and separating from the product of conversion a $C_8$ fraction, subjecting the $C_8$ fraction to further disproportionation to produce an effluent enriched with trimethylbenzenes, subsequently separating from the effluent a $C_9$ fraction and thereafter separating and recovering mesitylene from the $C_9$ fraction. Alternatively, pseudocumene can be recovered from the $C_9$ fraction alone or in addition to mesitylene.

In a highly preferred embodiment, the present invention contemplates a continuous process for the preparation of methylated aromatic hydrocarbons the steps of which comprise introducing a fresh feed of toluene to a e disproportionation reactor in the presence of hydrogen and a catalyst, separating the effluent from the reactor into a benzene stream, a toluene stream, a $C_8$ stream and a $C_9$ and heavier stream. Unconverted toluene is recycled to the toluene disproportionation reactor, benzene can be recovered directly and the $C_9$ and heavier fraction is recovered and can be routed to a motor naphtha pool. Inasmuch as the separated $C_8$ aromatic stream formed by toluene disproportionation contains a small amount of ethylbenzene, some purification of this predominantly xylene stream is desirable before charging the same to the second disproportionation reactor. Preferably, the stream introduced to the second disproportionation reactor contains less than 0.3 weight percent ethylbenzene. For example, in the instance where no separations of xylenes are planned, then the minor amount of ethylbenzene in the $C_8$ aromatic stream, generally about one percent, can be removed by distilling the stream and removing an ethylbenzene rich stream overhead. Some paraxylene will also be taken overhead along with the ethylbenzene but the remaining $C_8$ stream will be essentially free of ethylbenzene and as such can be used as the feed to the second disproportionation reactor.

In the instance where paraxylene is to be recovered by for example, fractional crystallization, the separated $C_8$ aromatic stream is first routed to a paraxylene recovery unit and thereafter ethylbenzene is stripped from the paraxylene depleted $C_8$ stream by distillation as mentioned above. The residual xylenes, namely orthoxylene and metaxylene, forming the depleted $C_8$ stream are then fed to the second disproportionation reactor. The recovery of paraxylene from the $C_8$ stream represents a preferred embodiment of this invention.

In another embodiment, orthoxylene is recoverable from the separated $C_8$ aromatic stream by fractionation taking the remaining $C_8$ aromatics overhead. Ethylbenzene can be separated from the orthoxylene depleted stream by distilling and removing the ethylbenzene rich overhead. In a further embodiment, metaxylene may be separated by sulfonation as described in U.S. Pat. 3,311,670.

Alternatively each of the $C_8$ aromatics may be separated by cyclic chromatographic adsorption.

The residuum from the ethylbenzene separation is thereafter introduced to a second disproportionation reactor where it is contacted with a catalyst and hydrogen and this second reactor effluent passes to a two-fractionator system for separation and recycle. The overhead from the first fractionator comprises a $C_6$–$C_8$ aromatic fraction which is recycled and joins the liquid effluent from the toluene disproportionation reactor and is concurrently separated into the component streams above. A $C_{10}$ and heavier fraction can be recovered from the first fractionator and routed to a motor naphtha pool. The $C_9$ fraction from the first fractionator is then introduced to the second fractionator where an overhead composed of residual amounts of xylenes and meta- and para-ethyltoluenes is routed to motor fuel, mesitylene and/or pseudocumene is recovered and a higher boiling fraction containing unrecovered pseudocumene and hemimellitene is recovered as bottoms and recycled for reintroduction to the second disproportionation reactor.

In a particularly desirable embodiment the $C_{10}$ and heavier fraction recovered from the first of the two fractionator system is introduced to a durene recovery sequence which comprises separating from this fraction a concentrate boiling in the range of 188 to 195° C. The 188–195° C. feed is preferably mixed with a light hydrocarbon such as n-hexane and thereafter cooled to a temperature of from about —30 to 100° F. in a scraped-surface exchanger. The resulting slurry can be separated as by centrifugation into a filtrate and a cake. The cake can be reslurried with the light hydrocarbon and recrystallized. The cake after removal of the light hydrocarbon is greater than 95 percent durene. The filtrate after removal of the light hydrocarbon can be recycled to the second disproportionation reactor. The $C_{10}$ and heavier 188–195° C. depletes fraction along with the $C_9$ and heavier bottoms separated from the initial toluene disproportionation effluent each comprising ethylaromatic derivatives, such as orthoethyltoluene, are thereafter introduced to a deethylating unit wherein the ethyl functional groups alkylated to the methylbenzenes are removed by cracking, preferably by thermal hydrocracking. The deethylated product is thereafter recycled for introduction to the second disproportionation reactor. This latter embodiment is beneficially employed when greater amounts of durene are desired as the recycle of the deethylated tetramethylbenzenes and pentamethyl benzenes will increase the amount of the $C_{10}$ fraction containing durene.

Referring to the drawing, the present invention can be more readily understood by reference thereto. Toluene in line 2, is fed to disproportionation reactor 4 wherein toluene is contacted with catalyst and hydrogen and disproportionated to benzene, xylenes, trimethylbenzenes and and ethylaromatics. The liquid effluent from reactor 4 is discharged through line 6 and introduced to fractionator 8 wherein benzene is recovered overhead in line 10 and toluene is separated and recycled to disproportionation reactor 4 via lines 12 and 2. A $C_9$ and heavier bottoms is removed from fractionator 8 through line 14 and recovered through line 16 for routing to a motor naphtha pool. A variety of catalyst systems will disproportionate toluene and the catalyst employed in disproportionation reactor 4 can be such well known commercial materials as silica alumina, aluminum fluoride, rare earth exchanged zeolite X, hydrogen zeolite Y and acid mordenite. In a preferred embodiment, the catalyst employed in disproportionation reactor 4 comprises a decationized mordenite containing a sulfided Group VIII metal as recited in U.S. Pat. 3,476,821. Alternatively, the catalyst may be a composite of a hydrogen mordenite, alumina and a sulfided Group VIII metal or a composite comprising a hydrogen mordenite and a Group I–B metal alone or in combination with a Group VI–B metal. Suitable conditions for disproportionating the toluene feed in disproportionation reactor 4 include a temperature of from about 400 to 1000° F., preferably from about 500 to 950° F., pressures of from 100 to 2500 p.s.i.g., preferably 200 to 2000 p.s.i.g., liquid hourly space velocities of 0.2 to 10 and hydrogen to hydrocarbon mole ratios of 1:1 to 20:1.

In operating the Group VIII metal sulfide catalysts mention above, it is necessary to add a small amount of a sulfide to the feed to maintain catalyst selectivity. This may be accomplished by introducing hydrogen sulfide to the hydrogen stream, the latter added together with the toluene feed to the disproportionation reactor. Hydrogen consumption in the process is low and is mainly confined to solution losses and in generating naphthenes. The hydrogen and hydrogen sulfide can of course be separated from the overall products of reactor 4 and recycled.

The $C_8$ fraction is recovered from fractionator 8 via line 18 and is introduced to disproportionation reactor 20. It has been found that the $C_8$ stream from fractionation 8 is substantially free of ethylaromatic hydrocarbons such as ethylbenzene and that the ethyl derivatives such as ethyltoluenes and ethylxylenes are removed through line 14 in the $C_9$ and heavier fraction. Direct recycle of the $C_9$ and heavier fraction to reactor 4 is specifically avoided as such a practice increases the ethyl aromatic impurity concentrations in the $C_8$ fraction recovered in line 18. The $C_8$ fraction substantially free of ethylaromatics in line 18 and containing about one percent ethylbenzenes prior to introduction to disproportionation reactor 20 is preferably distilled and an ethylbenzene rich stream is removed overhead. In this manner a feed containing less than 0.3 weight percent ethylbenzene is introduced to reactor 20.

In a highly preferred embodiment the $C_8$ fraction is introduced into xylene separator 22 wherein for example paraxylene is removed by crystallization from the $C_8$ fraction in separator 22 through line 24 and the residuum of the $C_8$ stream is preferably distilled so as to reduce the ethylbenzene content to less than 0.3 weight percent prior to entering disproportionation reactor 20 via line 18. The particular xylene isomer i.e., ortho-, meta- or paraxylene, can be separated from the mixture of $C_8$ isomers in line 18 by the various methods known to the art and the residual $C_8$ fraction after separation may be recovered as a raffinate, mother liquor, a distillation fraction, filtrate or other fraction depending upon the particular technique employed. In the case of paraxylene, separator 22 may consist of a fractional crystallization zone through which the $C_8$ stream is introduced wherein paraxylene is crystallized at low temperatures. The crystallized mixture is next introduced into a centrifuge from which crystallized paraxylene is removed as a cake and the mother liquor or residuum recovered as the filtrate after removal of ethylbenzene is introduced to reactor 20. Alternatively the crystallized paraxylene may be separated by filtration, decantation or other suitable solid-liquid separation means.

Alternatively orthoxylene may be separated from the C$_8$ fraction in line 18 by fractionation, thereafter ethylbenzene separated as an overhead from the orthoxylene depleted C$_8$ fraction and the remainder comprising para- and metaxylene introduced to reactor 20. Where metaxylene is sought to be recovered the same may be accomplished by sulfonation as described in U.S. Pat. 3,311,670 and ethylbenzene thereafter separated by distillation.

Within reactor 20, the C$_8$ fraction is disproportionated in the presence of hydrogen under conversion conditions including a temperature of from about 400 to 900° F., preferably from about 450 to 850° F., pressures of from 100 to 2500 p.s.i.g., preferably 200 to 2000 p.s.i.g., liquid hourly space velocities of 0.2 to 10 and hydrogen to hydrocarbon mole ratios from 1:1 to 20:1. The catalyst employed in reactor 20 is the same as that described in connection with disproportionation reactor 4.

The liquid effluent from disproportionation reactor 20 is introduced to fractionator 26 via line 28 wherein a C$_6$ to C$_8$ stream is taken overhead and reintroduced to fractionator 8 via line 30. A C$_{10}$ and heavier bottoms fraction is removed from fractionator 26 through line 32 and recovered via line 34 for routing to a motor naphtha pool. The C$_9$ aromatic fraction from fractionator 26 is introduced to fractionator 36 through line 38 wherein a light fraction containing residual amounts of xylene, m-ethyltoluene and p-ethyltoluene are taken overhead and recovered via line 40 and a higher boiling fraction containing primarily pseudocumene and hemimellitene is recovered as bottoms through line 42. Mesitylene is recovered from fractionator 36 via line 44 and, if desired, pseudocumene can be recovered from fractionator 36 via line 46. Unrecovered pseudocomene and hemimellitene in line 42 are alternatively recycled to disproportionation reactor 20 via lines 42, 48, 74 and 18.

In a further embodiment of this invention the C$_{10}$ and heavier fraction in line 32 is routed to a durene recovery unit via line 50 and introduced to fractionator 52 wherein an overhead comprising residual amounts of pseudocumene, hemimellitene and ethylxylenes is recovered via line 54 and a bottoms fraction comprising pentamethylbenzene, ethyltrimethylbenzene and heavier is removed via line 56. A fraction boiling between 188 and 195° C. is removed from fractionator 52 through line 58 and introduced to separator 60. In separator 60, the 188–195° C. feed is mixed with light hydrocarbon, such as n-hexane, and then chilled to as low as −30° F. in a scraped-surface exchanger. The slurry may be warmed slightly to −5° F. to remelt the small crystals. The slurry is separated into a filtrate and a cake containing about 75 percent solids. The cake is reslurried with hexane and recrystallized. After dehexanization, the cake comprises greater than 95 percent durene. Durene is removed from separator 60 through line 62 and the residuum of the 188–195° C. fraction is recycled to disproportionation reactor 20 through lines 64, 74 and 18.

If desired the C$_9$ plus bottoms in line 14 can be introduced via lines 66 and 68 to deethylator 70. In addition the bottoms fraction in line 56 can also be introduced to deethylator 70 via lines 72 and 68. The stream entering deethylator 70 contains a high ethylaromatic derivatives content which undergoes thermal cracking in deethylator 70 wherein the ethyl functional groups are removed under conversion conditions of 1000 to 1300° F., pressures of from 100 to 1000 p.s.i.g. and hydrogen to hydrocarbon mole ratios of from 3:1 to 15:1. The residence time can range from 0.5 to 60 seconds. Some methyl groups will also be removed and the deethylated product comprises benzene, toluene and polymethylbenzenes. The benzene and toluene along with methane and ethane may be stripped from the product and removed via line 76 and the remaining C$_8$ and heavier material recycled to disproportionation reactor 20 via lines 74 and 18. Inasmuch as the total amount of deethylated stock is small, all of the liquid product, that is benzene, toluene and polymethylbenzenes can be charged to disproportionation reactor 20 without significantly affecting the product distribution.

In order to more fully illustrate the nature of this invention the following example is presented.

EXAMPLE

A fresh feed comprising toluene is introduced at the rate of 10,000 pounds per hour along with 9850 pounds per hour of recycle toluene from fractionator 8 through line 12 to disproportionation reactor 4 through line 2 with hydrogen and 0.2 weight percent hydrogen sulfide basis the toluene feed. The conversion temperature in reactor 4 is maintained at 550° F. under a hydrogen pressure of 800 p.s.i.g. where the charge passes through reactor 4 at 2.0 LHSV and where hydrogen is introduced at the rate of 6000 s.c.f. per barrel of feed over a composite catalyst consisting of 7.5 weight percent cobalt sulfide, 15 weight percent alumina and the remainder hydrogen mordenite having a $SiO_2/Al_2O_3$ mole ratio of 40:1. Hydrogen and hydrogen sulfide can be separated from the reactor effluent in line 6 as a gaseous stream and recycled to reactor 4. The liquid effluent in line 6, analyzed and summarized in Table I, is introduced to fractionator 8 wherein benzene is taken overhead through line 10 and a C$_9$ and heavier bottoms is withdrawn through line 14.

TABLE I

| Product: | Analysis, wt. percent |
|---|---|
| Naphthenes | 0.18 |
| Benzenes | 22.89 |
| Toluene | 49.07 |
| Ethylbenzene | 0.09 |
| Paraxylene | 5.84 |
| Metaxylene | 12.89 |
| Orthoxylene | 4.85 |
| m-Ethyltoluene | 0.08 |
| p-Ethyltoluene | 0.16 |
| o-Ethyltoluene | 0.03 |
| Mesitylene | 1.10 |
| Pseudocumene | 2.34 |
| Hemimellitene | 0.30 |
| Ethylxylenes | 0.05 |
| Tetramethylbenzenes | 0.13 |

C$_8$, C$_9$ and C$_{10}$ fractions are obtained from the liquid products in line 6. The ethylaromatic derivative weight percent content in each of the fractions obtained is as follows: the C$_8$ fraction 0.36, the C$_9$ fraction 6.3 and the C$_{10}$ fraction 28.0 weight percent. As can be seen, the heavier fractions contain a higher content of ethylaromatic derivatives than the fraction one carbon lighter. In the practice of the instant invention, direct recycle of the bottom fraction to disproportionation reactor 4 is avoided inasmuch as such a practice would increase the ethylaromatic impurity concentrations in the fraction from which xylenes and tri- and tetramethylbenzenes are recovered.

The liquid in line 6 is combined wtih the C$_6$–C$_8$ fraction from fractionator 26 via line 30 and introduced to fractionator 8. Toluene, 9850 pounds per hour, is removed through line 12 and recycled to reactor 4 through line 2. A C$_9$ and heavier bottoms from fractionator 8 is withdrawn through line 14 and, if desired, routed to a motor naphtha pool through line 16 or to deethylating unit 70 via lines 66 and 68.

The C$_8$ fraction is recovered through line 18 at a rate of 5175 pounds per hour and comprises 24.6 weight percent paraxylene, 54.6 weight percent metaxylene, 20.5 weight percent orthoxylene and 0.35 weight percent ethylbenzene. 1060 pounds per hour of orthoxylene is recovered from the C$_8$ aromatics in line 18 by distillation equipment not shown taking the other three components overhead. The overhead stream consisting of paraxylene, metaxylene and ethylbenzene is fed to a separator, not shown, wherein paraxylene crystals are formed on cooling the stream to approximately $-108°$ F. and are separated by centrifugation. Paraxylene, 780 pounds per hour, is recovered and the mother liquor is sent to the motor naphtha pool. 1060 pounds per hour of orthoxylene containing less than 0.3 weight percent ethylbenzene in line 18 is introduced to disproportionation reactor 20 along with hydrogen and hydrogen sulfide at the rate of 0.2 weight percent sulfide basis the liquid feed. The temperature in reactor 20 is maintained at 550° F., hydrogen introduced at the rate of 6000 s.c.f. per barrel of liquid feed and the conversion conducted at an LHSV of 2 at 1000 p.s.i.g. over a composite catalyst consisting of 7.7 weight percent nickel sulfide, 15 weight percent alumina and remainder hydrogen mordenite having a $SiO_2/Al_2O_3$ mole ratio of 60:1. Hydrogen and hydrogen sulfide can be separated from the reactor effluent in line 28 as a gaseous stream and recycled to reactor 20. Table II below summarizes the liquid products obtained in line 28 from disproportionation reactor 20.

TABLE II

| Products: | Analysis, wt. percent |
|---|---|
| Naphthenes | 0.15 |
| Benzene | 2.03 |
| Toluene | 19.69 |
| Ethylbenzene | <0.004 |
| Paraxylene | 12.04 |
| Metaxylene | 27.64 |
| Orthoxylene | 10.40 |
| p-Ethyltoluene | 0.02 |
| m-Ethyltoluene | 0.06 |
| o-Ethyltoluene | 0.01 |
| Mesitylene | 7.18 |
| Pseudocumene | 15.82 |
| Hemimellitene | 1.93 |
| Ethylxylenes | 0.13 |
| Durene | 1.19 |
| Isodurene | 1.43 |
| Prehnitene | 0.28 |

The liquid products in line 28 are separated into a $C_8$ and lighter fraction, a $C_9$ fraction and a $C_{10}$ and heavier fraction in fractionator 26. In the $C_8$ fraction the weight percent ethylbenzene was less than 0.008; the ethyltoluene content in the $C_9$ fraction was 0.35 weight percent; and the ethylxylene content in the $C_{10}$ fraction was 4.3 weight percent. As can be seen, when xylenes recovered from disproportionation reactor 4 via fractionator 8 and thence through line 18 are used as the feed to disproportionation reactor 20, the $C_8$ and $C_9$ fractions of the product in line 28 are relatively free of ethyl derivatives, that is, ethylbenzene and ethyltoluenes. The majority of the ethyl groups are concentrated in the heavy fractions, that is, the $C_{10}$ and heavier cuts.

The $C_8$ and lighter products are returned to fractionator 8 through line 30 for further separation. The $C_{10}$ and heavier fraction is drawn off through line 32. The $C_9$ fraction is taken via 38 at a rate of 265 pounds per hour and consists of about 0.3 weight percent meta- and paraethyltoluenes, 0.05 percent orthoethyltoluene, 28.7 percent mesitylene, 63.3 percent pseudocumene and 7.7 percent hemimellitene.

The $C_9$ fraction in line 38 is introduced to fractionator 36 where residual amounts of xylenes and the meta- and para-ethyltoluenes are removed as overhead through line 40. This overhead can be routed to a motor naphtha pool or sent to deethylating unit 70. Mesitylene is recovered through line 44 at a rate of approximately 75 pounds per hour. Pseudocumene is recovered through line 46 at a rate of approximately 169 pounds per hour and hemimellitene through line 42 at a rate of about 21 pounds per hour.

When xylene is the feed to disproportionation unit 20, the bottoms from fractionator 26 may be routed to motor naphtha pool through lines 32 and 34.

When disproportionation reactor 20 is operated with recycle of pseudocumene and hemimellitene from lines 42, 48, 74 and 18 as a first feed or optionally with tetramethylbenzenes through lines 64, 74 and 18 as a second feed, the composition of the product is shown in Table III. Here reactor 20 is operated with a catalyst consisting of 7 percent cobalt sulfide, 15 weight percent alumina and the remainder hydrogen mordenite having a $SiO_2/Al_2O_3$ mole ratio of 40:1. The average number of methyl groups per benzene ring in each feed is 2.5 and 3 respectively. The feeds are 1:1 molar ratio orthoxylene to trimethylbenzene (2.5 methyl groups per benzene ring) and 1:3:1 molar ratio of orthoxylene to trimethylbenzene to tetramethylbenzene (3 methyl groups per benzene ring). Operating conditions are 2 LHSV aromatic feed plus 0.2 percent sulfide basis aromatic feed, 800 p.s.i.g., 5700 s.c.f. hydrogen per barrel of feed and at the temperatures shown in Table III.

TABLE III

| Feed | 1 | 2 |
|---|---|---|
| Average number methyl groups/benzene | 2.5 | 3 |
| Temperature, °F | 530 | 550 |
| Products: | | |
| Lighter than $C_6$ | 0.05 | 0.13 |
| Naphthenes | 0.22 | 0.49 |
| Benzene | 0.60 | 0.08 |
| Toluene | 8.15 | 2.43 |
| Paraxylene | 8.62 | 4.48 |
| Metaxylene | 21.55 | 10.12 |
| Orthoxylene | 7.09 | 4.11 |
| p-Ethyltoluene | 0.03 | 0.04 |
| m-Ethyltoluene | 0.10 | 0.13 |
| o-Ethyltoluene | 0.01 | 0.02 |
| Mesitylene | 11.95 | 14.88 |
| Pseudocumene | 28.15 | 33.22 |
| Hemimellitene | 3.28 | 3.99 |
| Ethylxylenes | 0.26 | 0.59 |
| Durene | 3.68 | 9.13 |
| Isodurene | 5.35 | 13.17 |
| Prehnitene | 0.93 | 2.24 |
| $C_{11}$ and heavier | | 0.77 |

It is apparent from an examination of Table III that when disproportionation reactor 20 is operated with trimethylbenzene or trimethyl and tetramethylbenzene recycle, the yields of mesitylene and durene are substantially increased. In addition, the amount of orthoethyltoluene is very low making it possible to recover mesitylene by means of distillation in good yield through line 44.

The $C_{10}$ and heavier fraction taken as a bottoms from fractionator 26 through line 32 can be routed to a durene recovery unit via line 50. Typically, this $C_{10}$ and heavier fraction when the second disproportionation unit operates with a feed averaging between 2.5 and 3 methyl groups per benzene ring upon analysis contains the materials listed in Table IV.

TABLE IV

| Component: | Weight percent |
|---|---|
| Pseudocumene | 0.04 |
| Hemimellitene | 0.62 |
| 1,3-dimethyl-5-ethylbenzene | 0.13 |
| 1,3-dimethyl-4-ethylbenzene | 0.12 |
| 1,4-dimethyl-2-ethylbenzene | 0.16 |
| 1,2-dimethyl-4-ethylbenzene | 0.37 |
| 1,2-dimethyl-3-ethylbenzene | 0.04 |
| Durene | 32.55 |
| Isodurene | 49.15 |
| Prehnitene | 10.88 |
| $C_{11}$ ethylaromatics | 1.01 |
| Pentamethylbenzene | 3.78 |
| Heavier | 1.15 |

Crystals form from this $C_{10}$ and heavier material on cooling to room temperature and can be removed by filtration without dilution. Analysis show they contain 80 percent durene. Additional amounts of durene can be recovered without dilution by filtering off the crystals as the $C_{10}$ and heavier stream is incrementally cooled to 0° F. The durene depleted mother liquor may then be routed to a deethylating unit 70 prior to recycle to disproportionation reactor 20.

Preferably, the durene containing fraction is concentrated by routing the $C_{10}$ and heavier fraction from fractionator 26 through lines 32 and 50 to fractionator 52 wherein residual amounts of trimethylbenzenes and ethylxylenes are taken overhead via line 54. The bottoms consisting of prehnitene and the $C_{11}$ and heavier material is taken off via line 56. Both the overhead via line 54 and the bottoms via line 56 may be routed to a deethylating unit 70 where ethyl functional groups are hydrocracked off of the benzene rings before the deethylated stock is returned to disproportionation reactor 20 via lines 74 and 18.

The tetramethylbenzenes taken off of fractionator 52 via line 58 and containing approximately 38 percent durene, 57.4 percent isodurene and 4.6 percent prehnitene are introduced to durene recovery unit 60. To improve filtration, hexane is added and the mixture is cooled to —20° F. The durene rich crystals are removed by centrifugation through line 62 and after recrystallization yield durene of greater than 95 percent purity.

The durene depleted mother liquor from durene recovery unit 60 after solvent stripping contains approximately 11 percent durene, 82.4 percent isodurene and 6.6 percent prehnitene and can be recycled to disproportionation reactor 20 via lines 64, 74 and 18.

The streams containing predominantly ethylaromatics such as ethyltoluenes, ethylxylene and ethyltrimethylbenzenes in lines 14, 40, 54 and 56 can be collected and sent to the motor naphtha pool or to deethylating unit 70 where the ethyl groups are hydrocracked off of the benzene rings. The liquid product comprising mostly benzene, toluene, xylenes, trimethylbenzenes and tetramethylbenzenes is recycled via lines 74 and 18 to reactor 20. The overhead stream consisting of methane and ethane together with hydrogen is removed via line 76.

I claim:

1. A process for the production of methylated aromatic hydrocarbons which comprises the steps of:
   (a) contacting toluene with a disproportionation catalyst and hydrogen at a temperature of from about 400 to 1000° F., a pressure of from 100 to 2500 p.s.i.g. and a hydrogen to hydrocarbon mole ratio of 1:1 to 20:1 thereby forming benzene, xylenes, trimethylbenzenes and ethylated aromatics;
   (b) separating the product of (a) into a benzene fraction, a toluene fraction, a $C_8$ fraction and $C_9$ and heavier fraction, recovering said $C_9$ and heavier fraction, said $C_9$ and heavier fraction containing substantial amounts of said ethylated aromatics produced in (a), and recycling said toluene fraction to (a);
   (c) contacting said $C_8$ fraction of (b) with a disproportionation catalyst and hydrogen at a temperature of from about 400 to 900° F., a pressure of from 100 to 2500 p.s.i.g. and a hydrogen to hydrocarbon mole ratio of 1:1 to 20:1 thereby forming benzene, toluene, trimethylbenzenes, tetramethylbenzenes and ethylated aromatics;
   (d) separating the product of (c) into a $C_6$ to $C_8$ fraction, a $C_9$ fraction and a $C_{10}$ and heavier fraction, recovering said $C_{10}$ and heavier fraction, said $C_{10}$ and heavier fraction containing substantial amounts of said ethylated aromatics produced in (c) and recycling said $C_6$ to $C_8$ fraction to step (b); and
   (e) recovering said $C_9$ fraction of (d), said fraction being substantially free of ethylated aromatics.

2. A process according to claim 1 wherein paraxylene is separated and recovered from said $C_8$ fraction of (b).

3. A process according to claim 1 wherein orthoxylene is separated and recovered from said $C_8$ fraction of (b).

4. A process according to claim 1 wherein metaxylene is separated and recovered from said $C_8$ fraction of (b).

5. A process according to claim 1 wherein mesitylene is separated and recovered from said $C_9$ fraction in (e).

6. A process according to claim 1 wherein pseudocumene is separated and recovered from said $C_9$ fraction in (e).

7. A process according to claim 1 wherein mesitylene is separated and recovered from said $C_9$ fraction in (e) and where pseudocumene and hemimellitene are recycled to step (c).

8. A process according to claim 1 wherein a concentrated fraction boiling in the range of about 188 to 195° C. is separated from said $C_{10}$ and heavier fraction from step (d), said concentrated fraction thereafter cooled to a temperature of from —30 to 100° F. and recovering durene crystals from said concentrated fraction.

9. A process according to claim 1 wherein said $C_9$ and heavier fraction of step (b) and said $C_{10}$ and heavier fraction in step (d) are combined and deethylated to benzene and methylbenzenes and recycling said deethylated product to step (c).

10. A process according to claim 1 wherein said $C_8$ fraction in (c) contains less than 0.3 weight percent ethylbenzene.

11. A process according to claim 1 wherein said $C_8$ fraction of (b) is distilled and an ethylbenzene rich stream is separated therefrom.

12. A process according to claim 2 wherein said paraxylene depleted $C_8$ fraction is distilled and an ethylbenzene rich stream is separated therefrom.

13. A process according to claim 3 wherein said orthoxylene depleted $C_8$ fraction is distilled and an ethylbenzene rich stream is separated therefrom.

14. A process according to claim 1 wherein said $C_8$ fraction in (c) is orthoxylene.

15. A process according to claim 1 wherein said $C_8$ fraction in (c) is metaxylene.

16. A process according to claim 1 wherein said $C_8$ fraction in (c) is paraxylene.

17. A process according to claim 1 wherein said $C_9$ fraction of (d) is distilled and a xylene and ethyltoluene rich stream is separated therefrom.

18. A process according to claim 8 wherein said durene depleted $C_{10}$ fraction is recycled to step (c).

19. A process according to claim 8 wherein said $C_{10}$ and heavier 188 to 195° C. depleted fraction is deethylated to benzene and methylbenzenes and recycling said methylbenzenes to step (c).

References Cited

UNITED STATES PATENTS

| | | | |
|---|---|---|---|
| 3,009,004 | 11/1961 | Levy et al. | 260—672 T |
| 3,548,020 | 12/1970 | Gutberlet et al. | 260—672 T |
| 2,722,560 | 11/1955 | McCaulay et al. | 260—672 T |
| 3,651,162 | 3/1972 | Pohlmann et al. | 260—672 T |
| 2,857,441 | 10/1958 | McCaulay | 260—672 T |
| 2,881,228 | 4/1959 | McCaulay | 260—672 T |
| 3,031,513 | 4/1962 | Earhart et al. | 260—672 T |
| 3,597,492 | 3/1971 | Otani et al. | 260—672 T |

CURTIS R. DAVIS, Primary Examiner

U.S. Cl. X.R.

260—674 A